United States Patent [19]

Sato

[11] Patent Number: 5,410,582
[45] Date of Patent: Apr. 25, 1995

[54] REFERENCE-SIGNAL GENERATING APPARATUS

[75] Inventor: Tsuguo Sato, Kanagawa, Japan

[73] Assignee: Sony Corporation, Tokyo, Japan

[21] Appl. No.: 204,935

[22] Filed: Mar. 2, 1994

[30] Foreign Application Priority Data

Mar. 3, 1993 [JP] Japan .................. 5-042820

[51] Int. Cl.$^6$ ............................. H03K 21/40
[52] U.S. Cl. .............................. 377/51; 377/56; 327/94
[58] Field of Search .............. 327/61, 63; 377/48, 377/51, 56

[56] References Cited

U.S. PATENT DOCUMENTS 4,633,183 12/1986 Heatherington ............... 377/51
5,228,066 7/1993 De Vane ........................ 377/51
5,270,582 12/1993 Brown et al. .................. 328/63

FOREIGN PATENT DOCUMENTS 4303407 8/1993 Germany ............... 377/51

Primary Examiner—Margaret Rose Wambach
Attorney, Agent, or Firm—Jay H. Maioli

[57] ABSTRACT

A reference signal generator that operates in response to a digital control signal has an increased resolving power without the requirement for increasing the basic clock rate or increasing the bit capacity of a down counter by thinning a pulse from the basic clock signal each the down counter overflows so as to adjust the down-counting clock rate of the down counter. The down counter counts the higher-bit data of the digital control signal. The basic clock signal is multiplied by a decoded signal to obtain the adjustment of the down counting clock signal. The decoded signal is obtained by counting the overflow pulses from the down counter and decoding the counter output with the lower-bit data of the digital control signal.

11 Claims, 7 Drawing Sheets

REFERENCE-SIGNAL GENERATING APPARATUS

BACKGROUND OF THE INVENTION

1. Field of the Invention

The present invention relates generally to a signal generator and, more particularly, to a reference-signal generator suitable for use in a motor controlling system.

2. Description of the Prior Art

A motor controlling apparatus is known as shown in FIG. 6, in which a CPU 101 supplies a control signal, and a timer 102 generates a reference signal Fr from a clock signal CLK on the basis of the control signal from the CPU 101. The number of rotations of a motor 105 is detected by a rotation detector 106, and the frequency of the detector 106 output signal is divided by a frequency divider 108. A phase difference between the rotation number and the reference signal Fr is detected by a phase detector 103, and the output of the phase detector is used to form a phase loop. The output of the rotation detector 106 is also fed to a speed detecting unit 107 whose output is added to the output from the phase detector 103 by an adder 109, and the summed signals are amplified by an amplifier 104 before being fed to the motor 105. Thus, a speed loop is formed.

Such motor controlling apparatus controls the rotation rate of the motor by the speed loop and the phase loop, so as to synchronize the rotation with the reference signal Fr from the timer 102.

A reference-signal generating apparatus for generating a reference signal like that produced by the timer 102 is known to be constructed as shown in FIG. 7. The upper bits n1 and the lower bits n2 of the control signal from the CPU 101 are latched by a latch circuit 112 and repeatedly down-counted by a down counter 113 having the same number of counter steps as the bit number given by adding n1+n2. The frequency of an overflow output signal RIPPLE CLK thereof is divided by a frequency divider 114 formed of a flip-flop, so as to be one-half the frequency of the reference signal Fr.

In the above-described conventional motor controlling apparatus, when the motor rotation speed is controlled over a wide range, the reference signal Fr output from the timer 102 is also required to be varied over a wide range. Nevertheless, since the timer 102 repeatedly performs down-counting in response to speed data from the CPU 101 and outputs the reference signal Fr, a frequency ratio of a timer output when the speed data is N=99 to the timer output when the speed data being N=100, for example, is 1, while the frequency ratio of the timer output when the speed data is N=9 to the timer output when speed data is N=10 is 10.

Thus, the smaller the speed data from the CPU 101 becomes, the larger the rate of change of the reference signal Fr must become, so that a resolving power or resolution in the control of the motor speed is lowered. An increase of the resolving power of the timer 102 can be achieved by increasing the number of stages of the counter 113, however, in that case, in order to output the same reference signal Fr, the pulse rate of the input clock signal CLK 00 to the counter 113 is also required to be increased. Accordingly, there is then the inconvenience such that as the resolving power of the timer 102 is increased, a limitation of a maximum operation frequency of the counter 113 is caused and such limitation causes a limitation in the construction of the timer 102.

OBJECT AND SUMMARY OF THE INVENTION

The present invention is made in view of such defects, and an object thereof is to provide a reference-signal generating apparatus that improves the resolving power of the timer that generates the reference signal for controlling a motor.

A reference-signal generating apparatus according to one aspect of the present invention comprises a down counter for repeatedly outputting a reference signal Fr in response to the data of the higher bits n1 of an input data signal, a counter for counting an overflow output signal from the down counter, a decoder for decoding an output signal of the counter and the data of the lower bits n2 of the input data signal, and an AND circuit for taking a logical multiplication of an output signal of the decoder and a basic clock signal, wherein an output signal of the circuit is input as a clock signal to the down counter to thin out the clock pulses input to the down counter.

Also, according to the reference-signal generating apparatus of the present invention the data of the lower-bits n2 of the input data is supplied from a CPU.

According to another aspect of the reference-signal generating apparatus of the present invention the counter for counting the overflow output signal from the down counter is constructed with the same bit number as that of the data of the lower bits n2 of the input data.

According to the present invention described above, at most one pulse can be thinned out from the basic clock signal per one overflow of the counter, so that even if the counter for generating the reference signal Fr is constructed to accommodate n1 bits, the resolving power of n1+n2 bits can be obtained to thereby enable the counter to be operated with the clock which is $\frac{1}{2}$ n2 times as much as the prior art and a maximum operation frequency to be improved 2 n2 times as much as the prior art.

DETAILED DESCRIPTION OF PREFERRED EMBODIMENTS

Figure 1:
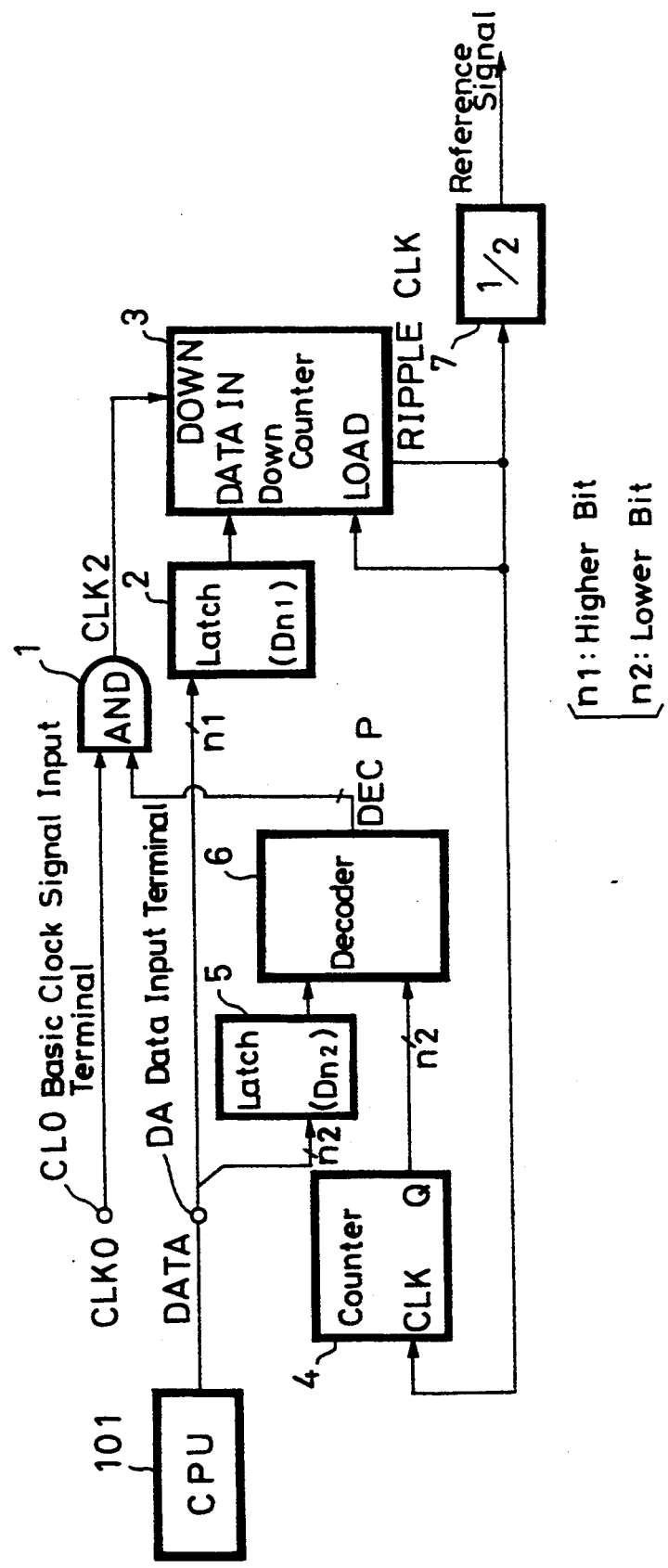
FIG. 1 is a block diagram of a reference-signal generating apparatus according to an embodiment the present invention.

In FIG. 1 a basic clock signal CLK0 is input to a basic clock signal input terminal CL0, and input data DATA is input from a CPU 101 to a data input terminal DA. The basic clock signal CLK0 is fed to one input terminal of an AND circuit 1. The data Dn1 of the higher bits n1 of the input data DATA is fed to a latch circuit 2. An output signal from the latch circuit 2 is fed to a DATA IN input terminal of a down counter 3, and an output signal CLK2 of the AND circuit 1 is fed to a DOWN input terminal of the down counter 3.

An overflow output signal RIPPLE CLK of the down counter 3 is fed to a LOAD input terminal of the down counter 3 and is also fed to a CLK input terminal of a counter 4, which can be a 2-bit counter. An output signal of the counter 4 is fed to one input terminal of a decoder 6, and an output signal of the decoder 6 is fed to the other input terminal of the AND circuit 1. The data Dn2 of the lower bits n2 of the input data DATA is fed to a second latch circuit 5. An output signal of the second latch circuit 5 is input to the other input terminal of the decoder 6. The frequency of the overflow output signal RIPPLE CLK from the down counter 3 is divided by one-half in a frequency divider 7 that outputs the reference signal Fr.

In such reference-signal generating apparatus, the data Dn1 of the higher bits n1 and the data Dn2 of the lower bits n2 are latched by the first latch circuit 2 and the second latch circuit 5, respectively. The down counter 3 is constructed with n1 bits and repeatedly performs the down-counting in response to the data Dn1 from the first latch 2. The frequency of the overflow output signal RIPPLE CLK is divided in half by the frequency divider 7 and is then output as the reference signal Fr.

Further, the overflow output signal RIPPLE CLK is counted by the counter 4 and a third data Dn3 is output to the decoder 6 from the counter 4. The data Dn3 and the data Dn2 of the lower bits n2 are compared, and a pulse DEC P for thinning out a pulse from the clock supplied to the down counter 3 is output from the decoder 6 and fed to the AND gate 1. If the lower-bit dat an2 is assumed to be two bits then the decoder 6 will have four inputs and can be readily constructed of standard logic elements, such as AND gates and OR gates, to decode the four input bits.

The pulse DEC P and the basic clock signal CLK0 are input to the AND circuit 1 and the clock signal CLK2 for the down counter 3 is generated therefrom and fed to the count down command terminal of the down counter 3, whereby one pulse can be thinned out from the basic clock signal CLK0 per one overflow of the down counter 3.

Therefore, even if the down counter 3 for generating a basic cycle is constructed with a bit size given by n1, the resolving power of n1+n2 bits can be obtained. Accordingly, when the same reference signal is output, the down counter can be operated with a clock that is ½ n2 times as much as the conventional reference-signal generating apparatus shown in FIG. 6. This means that the maximum operation frequency of a counter is improved 2 n2 times as much as that of the conventional apparatus.

Figure 2:
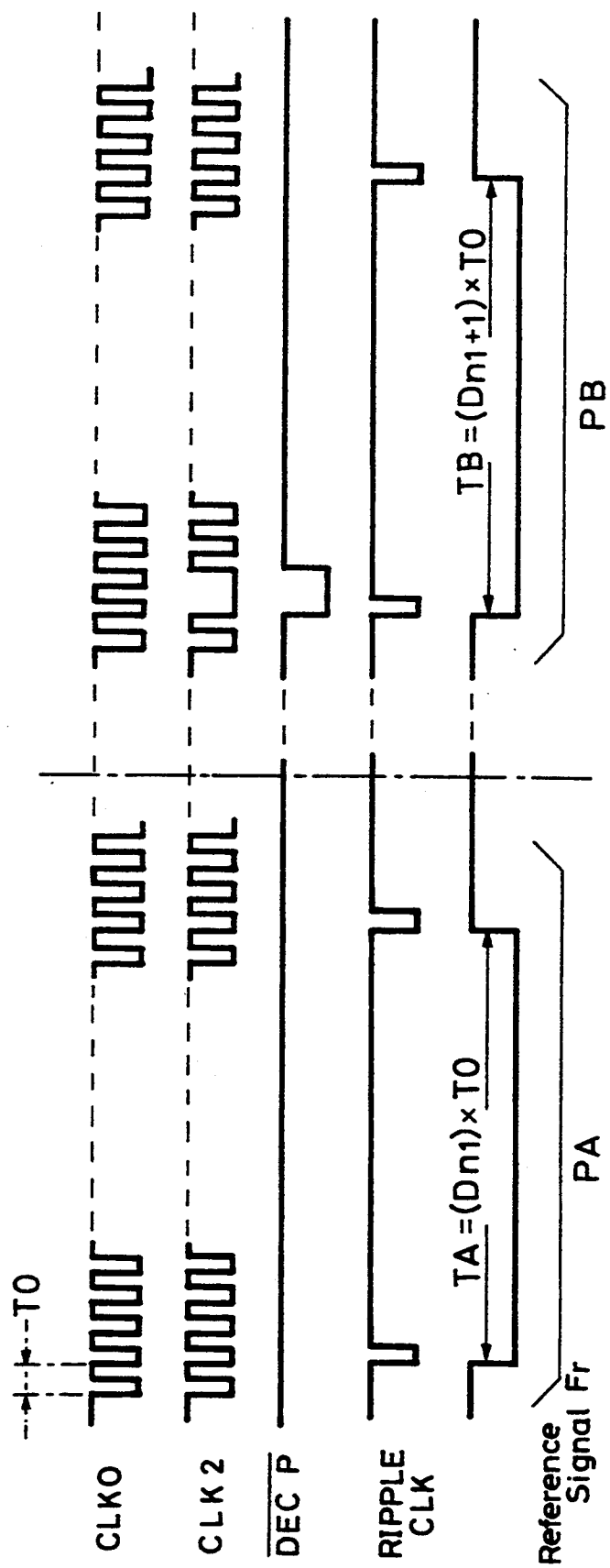
FIG. 2 is a diagram used to explain operation of the embodiment of FIG. 1.

If the lower bits n2=2 are determined, as shown in FIG. 2, then the pulse DEC P from the decoder 6 is not output during a portion PA of the reference signal Fr in case of the data Dn2 of the lower bits n2=0. At this time, the basic clock signal CLK0 is not thinned out, and CLK0=CLK2 is determined. Accordingly, a signal down-counted in response to the higher-bit Dn1 is output as the reference signal Fr. If a period of the basic clock signal CLK0 is defined as T0, then a pulse width TA of the reference signal is determined by TA=Dn1×T0.

During a portion PB of the reference signal Fr, if the higher-bit data Dn1 is the same and the lower-bit data Dn2=n is input, then the pulse DEC P is output from the decoder 6 one time per each one overflow of the down counter, in accordance with conditions of the data and the output Dn3 of the counter 4.

Since the output pulse DEC P of the decoder 6 and the basic clock signal CLK0 are input to the AND circuit 1, only one pulse is cut or thinned from a pulse sequence of the basic clock signal CLK0 in the output CLK2 from the AND circuit 2. The repeated data Dn1 of the down counter 3 is the same data as that operated upon during the PA portion, however, so that an output pulse at the PB portion is extended in time by one pulse. Therefore, TB=(Dn1+1)×T0 is determined and, as a result, the data of Dn1 is increased by one, that is, TB is longer than TA.

Figure 3:
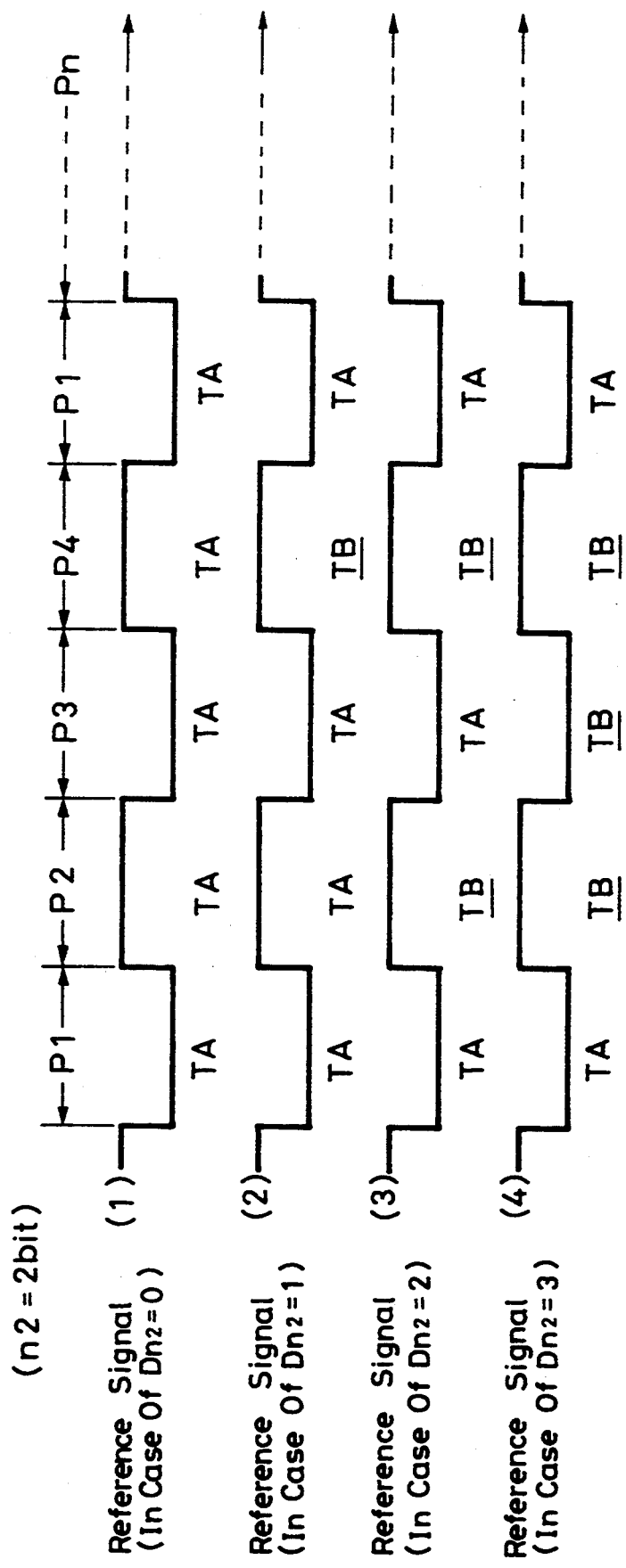
FIG. 3 is timing diagram used to explain operation of the embodiment of FIG. 1.

Next, the condition of the decoder 6 for outputting the pulse DEC P will be explained with reference to FIG. 3. When the lower-bit data is Dn2=0, the output pulse DEC P of the decoder 6 is not output, so that the reference signal is formed only of data of the Dn1. A signal having a pulse width TA is continuously output at cycles P1, P2, ... Pn.

Next, if the Dn data Dn1 is the same and the lower-bit data Dn2=1 is input, then the output pulse DEC P of the decoder 6 is output only at cycle P4 of the four cycles P1 to P4, because of the lower-bit data n2=2 bits. The pulse width is TA at each of cycles P1 to P3 and the pulse width is TB only at cycle P4.

Similarly, when the lower-bit data Dn2=2 is input, the output pulse DEC P of the decoder 6 is output at cycles P2 and P4 of the four cycles P1 to P4. The reference signal has the pulse widths TA at cycles P1 and P3 and the pulse widths TB at cycles P2 and P4, and then the process is repeated.

When the lower-bit data Dn2=3 is input, the pulse width is TA only at cycle P1 and the pulse width is TB at cycles P2, P3, and P4.

Thus, in case of the lower bits n2=2 bits, the pulse width of the reference signal is finely modulated in response to the lower-bit data Dn2 of $2^2=4$ combinations of repeat patterns, whereby the counter of n1 bit capacity can be operated with the resolving power of n1+n2 bit length.

Figure 4:
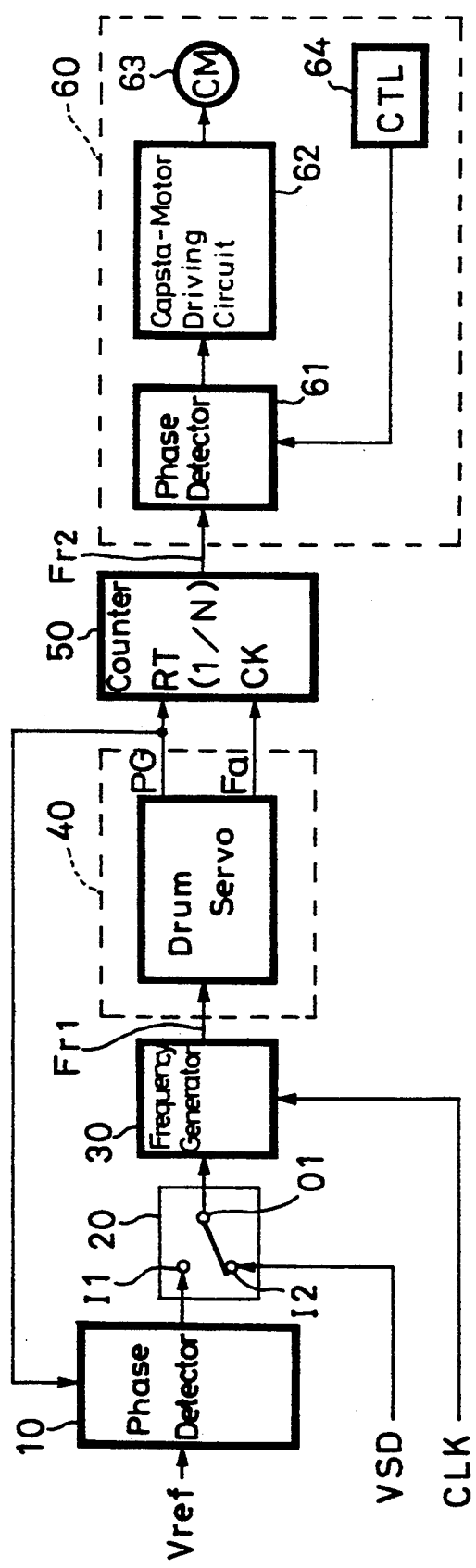
FIG. 4 is a block diagram of a servo controlling apparatus to which the reference-signal generating apparatus according to the present invention is applied.
Figure 6:
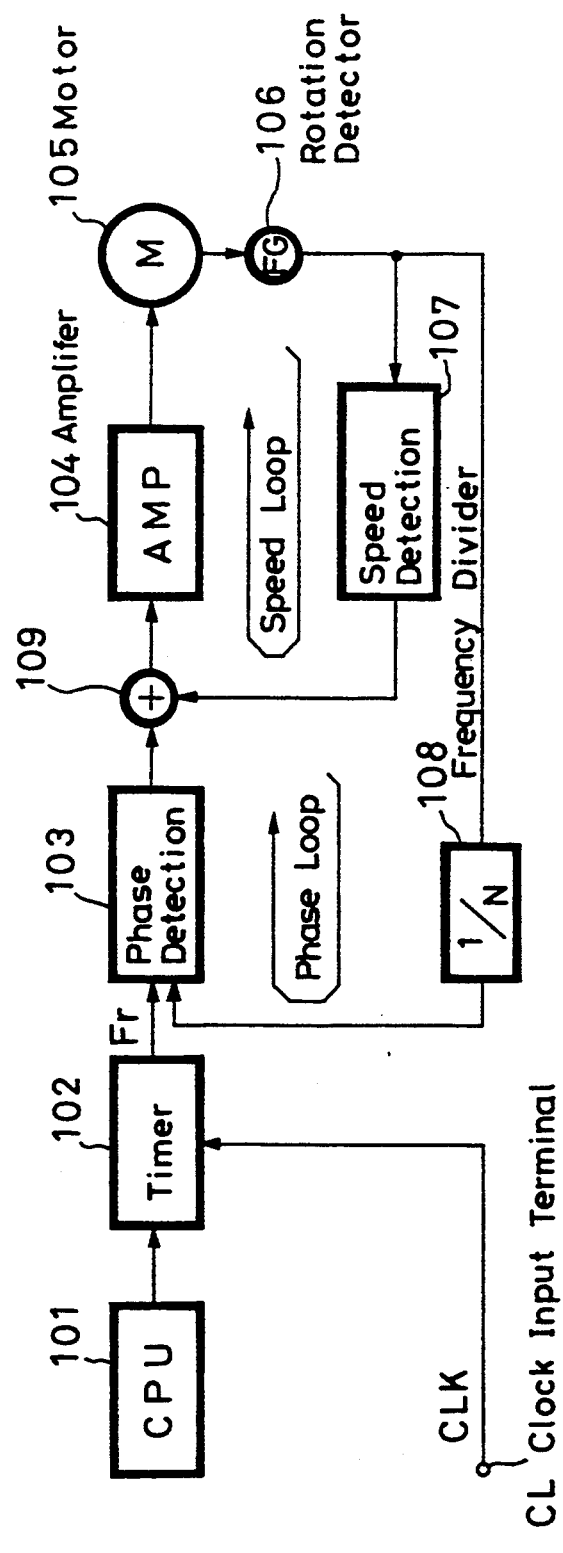
FIG. 6 is a block diagram of a conventional motor controlling apparatus.
Figure 7:
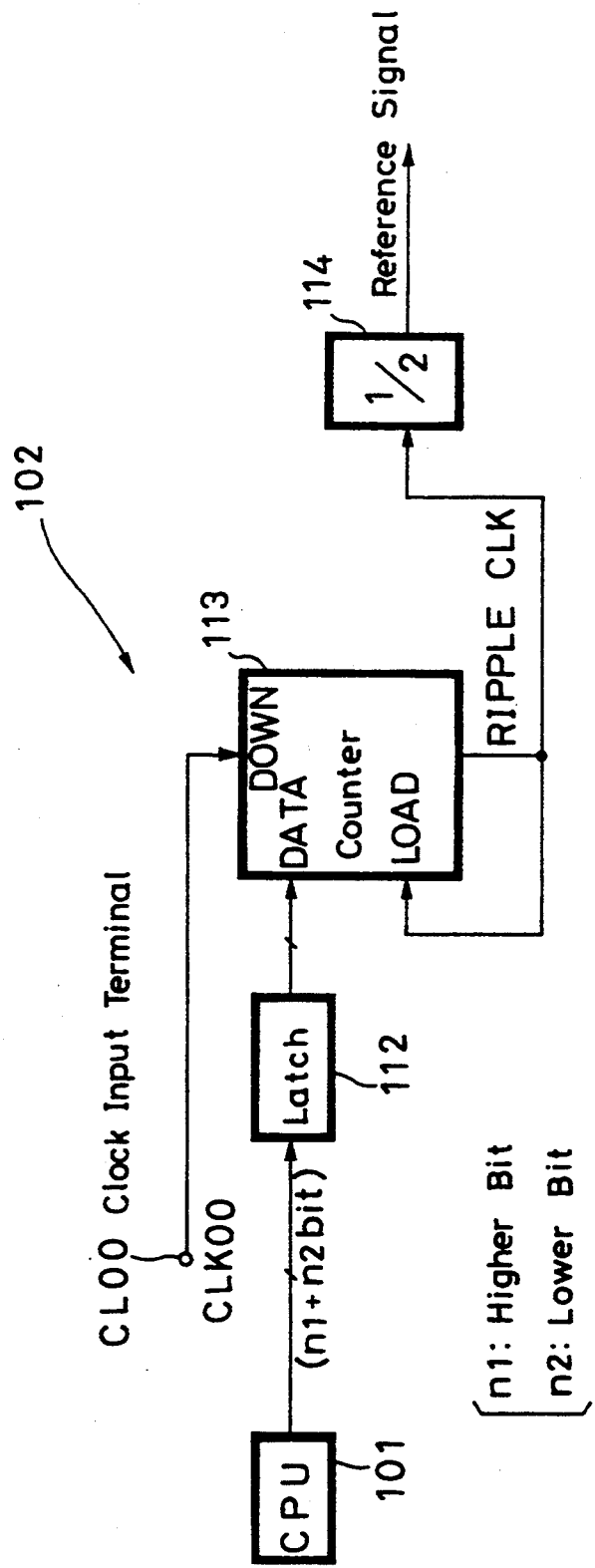
FIG. 7 is a block diagram of a conventional reference-signal generating apparatus.

Needless to say, such a reference-signal generating apparatus can be used in a motor controlling apparatus such as shown in FIG. 6 instead of the timer 102, and there is shown in FIG. 4 an example in which the reference-signal generating apparatus is used in a servo controlling apparatus in a VTR.

In FIG. 4, a phase detector 10 detects a phase difference between a reference signal Vref and a PG signal indicating a rotation reference position of a drum motor and provides a phase difference signal to input terminal 11 of a mode changeover switch 20. The mode changeover switch 20 is connected to the input terminal 11 in case of a normal play and to an input terminal 12, to which a variable speed data signal VSD is input, in case of a program play mode, such as a variable-speed reproduction or the like. A frequency generator 30 may embody the reference-signal generating apparatus according to the present invention. The frequency generator 30 generates a first servo reference signal Fr1 having a predetermined period on the basis of an output signal from the mode changeover switch 20 and the reference clock signal CLK, and signal Fr1 is fed to a drum servo system 40.

The drum servo system 40 is synchronized with the first servo reference signal Fr1 output from the frequency generator 30 to control a rotation of the drum motor. A frequency generator signal Fa is input to a clock input CK of a counter circuit 50 that generates a second reference signal Fr2 corresponding to one drum rotation and feeds the same to a capstan servo system 60. Also, a PG signal is input to a reset input RT of the counter circuit 50, which is reset per one drum rotation, in order to keep a phase relation between the second reference signal Fr2 and the PG signal constant.

In the capstan servo system 60, a phase difference between the second reference signal Fr2 and a signal pulse CTL from a CTL signal reading circuit 64 is detected by a phase detector 61. Feedback control is performed so that the phase difference should be "0". A capstan-motor driving circuit 62 is driven to control a capstan motor 63 in response to the output from the phase detector 61, whereby a capstan servo control is performed.

In such servo controlling apparatus, the frequency generator 30 generates the first servo reference signal Fr1, and the drum servo system 40 performs the drum servo control in synchronism with the first servo reference signal Fr1. The second servo reference signal Fr2, whose phase relation with the PG signal is constant, is generated by the counter circuit 50 on the basis of the PG signal and F signal Fa generated on the basis of the drum servo control. The capstan servo system 60 performs the capstan servo control in synchronism with the second servo reference signal Fr2.

Figure 5:
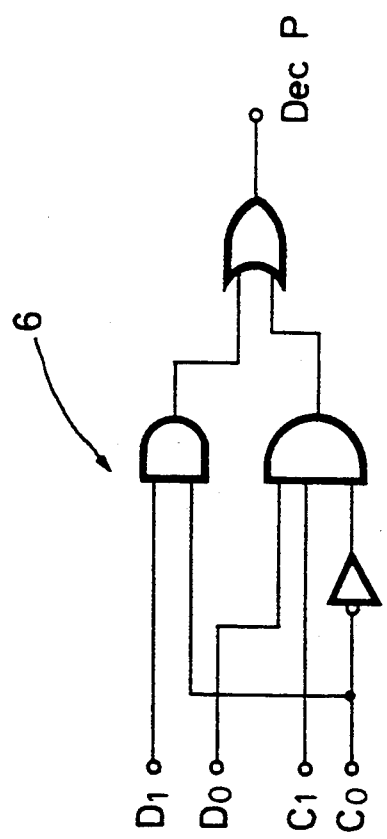
FIG. 5 is a schematic showing the decoder used in the embodiment of FIG. 1 in more detail.

An example of the logic elements used to construct the decoder 6 of FIG. 1 is shown in FIG. 5. This circuit decodes the two-bit $C_0$, $C_1$ signal from the counter 4 and the lower bit data signal $D_0$, $D_1$ from the digital input signal by comparing the two data signals to produce the output signal Dec P fed to the AND gate 1. The first count at $C_0$ and the second data bit $D_1$ are compared in AND gate 65 and the first count bit is inverted in inverter 66 and fed to a second AND gate 67 that also receives the second count bit $C_1$ and the first data bit $D_0$. The outputs from AND gates 65, 67 are fed to an OR gate 68 that produces the decoded output signal Dec P.

According to the present invention, since at most one pulse can be thinned out from the basic clock signal CLK0 per one overflow of the counter 3, even if the counter 3 for generating the reference signal Fr is constructed with n1 bits, the resolving power of n1+n2 bits can be obtained, the counter can be operated with a clock which is $\frac{1}{2}$ n2 times as much as the prior art, and a maximum operation frequency thereof can be improved 2 n2 times.

It is needless to say that the above-mentioned embodiment is but one example of the present invention and various modifications can be effected without deviating from a gist of the present invention.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A reference-signal generating apparatus, comprising:
    a down counter for repeatedly outputting a reference signal in the form of an overflow signal in response to higher-bit data of an input data signal;
    a counter for counting an overflow output signal from said down counter;
    a decoder for decoding an output signal of said counter and lower-bit data of said input data signal; and
    an AND circuit for taking a logical multiplication of an output signal of said decoder and a basic clock signal fed to said AND circuit, wherein an output signal of said AND circuit is fed to said down counter as a clock pulse signal in which a clock pulse is thinned out.

2. The reference-signal generating apparatus according to claim 1, further comprising a central processing unit for supplying the lower-bit data of said input data signal to said decoder.

3. The reference-signal generating apparatus according to claim 1, in which said counter for counting an overflow output signal from said down counter is constructed with the same bit number as the bit number of the lower-bit data of said input data signal.

4. An apparatus for generating a reference signal, comprising:
    a down counter supplied with a first data signal and a clock data signal for repeatedly counting down from said first data signal in response to said clock data signal and for outputting an overflow signal;
    a counter for counting said overflow signal from said down counter;
    decoder supplied with a second data signal and an output signal from said counter for decoding said second data signal and said output signal from said counter; and
    logic circuit means supplied with a reference clock signal and an output signal from said decoder for producing said clock data signal supplied to said down counter in response to said reference clock signal and said output signal from said decoder, whereby said overflow signal forms said reference signal.

5. The apparatus according to claim 4, wherein said logic circuit means comprises an AND circuit for performing logical multiplication of said reference clock signal and said output signal from said decoder.

6. The apparatus according to claim 4, wherein said first and second data signals are, respectively, higher-bit data and lower-bit data of an input data signal supplied by a processing unit.

7. The apparatus according to claim 6, wherein said counter for counting said overflow signal is constructed with the same bit number as the bit number of said second data signal.

8. Apparatus for generating a pulsed reference signal in response to a digital data signal and a reference clock signal fed thereto, the apparatus comprising:
    a down counter receiving higher-bit data of said digital data signal for repeatedly counting down from said higher-bit data at a rate determined by a down clock signal fed thereto and for producing a pulsed overflow output signal;
    a counter for counting pulses in said overflow output signal produced by said down counter;
    a decoder for decoding a count output from said counter and lower-bit data of said digital data signal; and
    an AND gate receiving at one input a decoded output signal from said decoder and the reference clock signal at another input for producing said down clock signal fed to said down counter, whereby down counting periods of said down counter are adjusted in response to said down clock signal from said AND gate and said overflow signal forms said reference signal.

9. The apparatus according to claim 8, further comprising a first latch receiving said higher-bit data of said digital data signal for feeding the higher-bit data to said down counter at a first predetermined timing, and a second latch receiving said lower-bit data of said digital data signal for feeding the lower-bit data to said decoder a second predetermined timing.

10. The apparatus according to claim 9, wherein said lower-bit data comprises two data bits and said counter comprises a two-bit counter.

11. The apparatus according to cali m10, wherein pulsed overflow output signal is fed to a load input of said down counter for causing said down counter to repeatedly count down in response thereto.

* * * * *